(12) United States Patent
Smith et al.

(10) Patent No.: US 12,013,191 B2
(45) Date of Patent: Jun. 18, 2024

(54) COILED SPRING

(71) Applicant: Katz Water Tech, LLC, Houston, TX (US)

(72) Inventors: Paul L. Smith, Katy, TX (US); Justin Vinson, Cypress, TX (US); Gary P Katz, Houston, TX (US)

(73) Assignee: Katz Water Tech, LLC, Houston, TX (US)

( * ) Notice: Subject to any disclaimer, the term of this patent is extended or adjusted under 35 U.S.C. 154(b) by 0 days.

(21) Appl. No.: 17/506,661

(22) Filed: Oct. 20, 2021

(65) Prior Publication Data

US 2022/0120516 A1    Apr. 21, 2022

Related U.S. Application Data

(60) Provisional application No. 63/094,340, filed on Oct. 20, 2020.

(51) Int. Cl.
| | | |
|---|---|---|
| F28F 13/12 | (2006.01) | |
| F16F 1/04 | (2006.01) | |
| F28F 1/40 | (2006.01) | |

(52) U.S. Cl.
CPC ............... F28F 1/40 (2013.01); F16F 1/042 (2013.01); F28F 13/12 (2013.01); *F16F 2230/36* (2013.01); *F16F 2238/026* (2013.01)

(58) Field of Classification Search
CPC ... F28F 13/12; F28F 1/40; F28F 1/405; B01F 25/4314; B01F 25/431971; B01F 25/43195; B01J 2219/00772
See application file for complete search history.

(56) References Cited

U.S. PATENT DOCUMENTS

| | | | | |
|---|---|---|---|---|
| 155,620 | A * | 10/1874 | Nixon | F28F 25/082 261/108 |
| 1,540,986 | A * | 6/1925 | Halle | C10C 1/04 196/115 |
| 1,782,396 | A * | 11/1930 | Aaron | F01N 1/12 181/280 |
| 3,582,045 | A * | 6/1971 | Leybourne, III | B01F 25/4314 138/42 |
| 3,589,687 | A * | 6/1971 | Leybourne | B01J 19/30 422/310 |
| 5,223,544 | A * | 6/1993 | Burkett | B29B 13/022 521/48.5 |
| 5,529,170 | A * | 6/1996 | Schwarz | B01D 21/2461 198/662 |
| 5,632,962 | A * | 5/1997 | Baker | B01F 25/431 366/337 |

(Continued)

FOREIGN PATENT DOCUMENTS

CN            202056233 U   *  11/2011

*Primary Examiner* — Eric S Ruppert
(74) *Attorney, Agent, or Firm* — Gary P. Katz; Katz Law Group, LLC

(57) ABSTRACT

A spring apparatus that has a section that is predominantly horizontal and a section of the spring that is predominantly vertical. The multiple spring assembly design allows for increased surface area, fluid flow, and improved heat transfer properties. The unique design allows the spring to fit in tight spaces and decreases issues when manufacturing complex spring designs and allows for efficient heat and fluid flow inside a tubular.

23 Claims, 14 Drawing Sheets

(56) References Cited

U.S. PATENT DOCUMENTS

| | | | | |
|---|---|---|---|---|
| 5,785,088 A * | 7/1998 | Pai | ............... | F28D 15/046 |
| | | | | 165/184 |
| 2011/0031666 A1* | 2/2011 | Warner | ............ | B21F 35/00 |
| | | | | 219/243 |

* cited by examiner

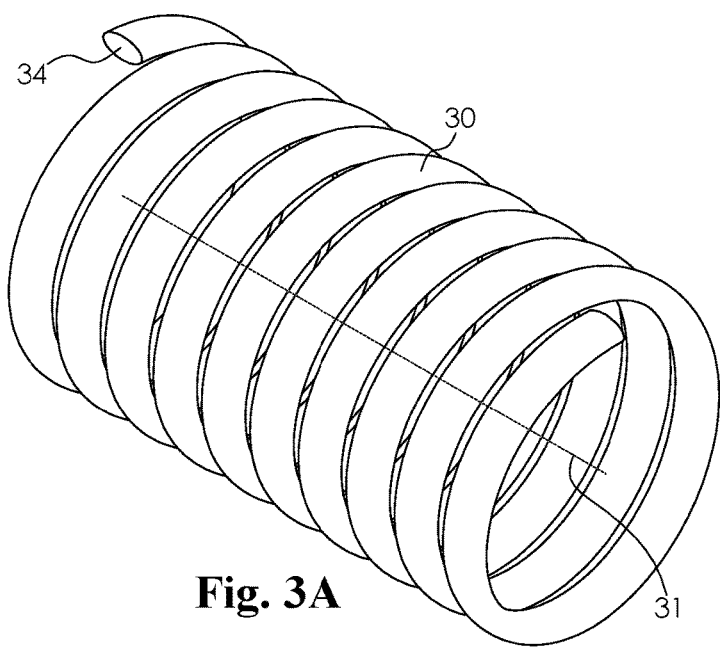
Fig. 3A
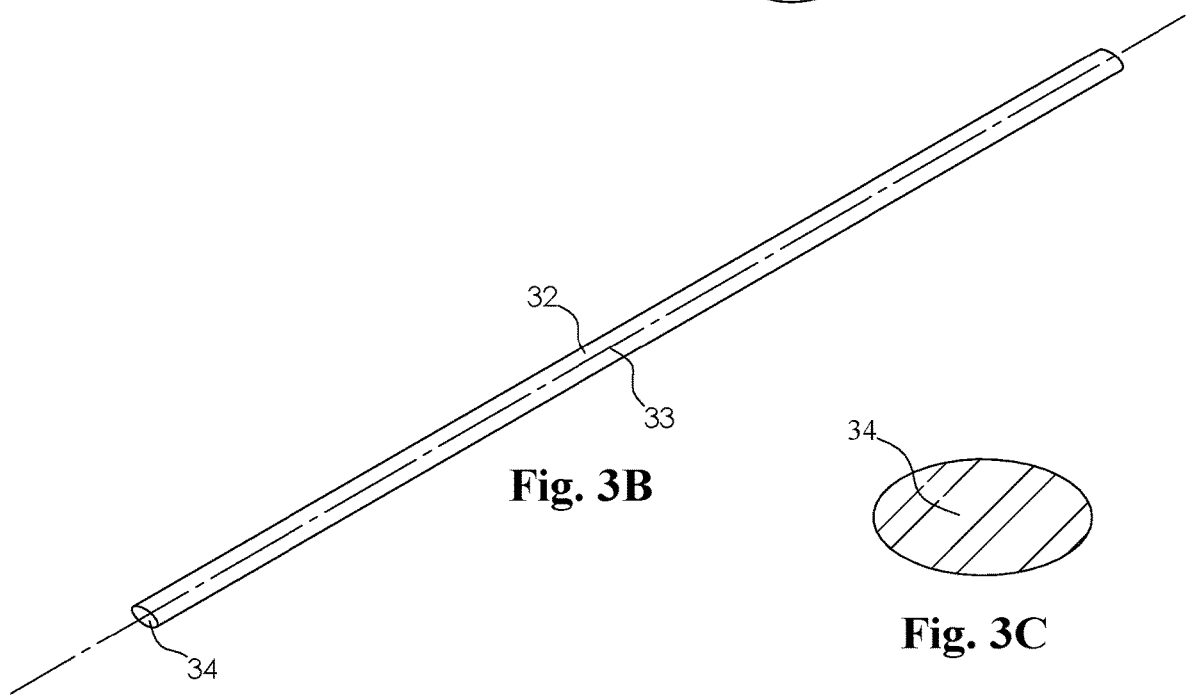
Fig. 3B
Fig. 3C

DETAIL R

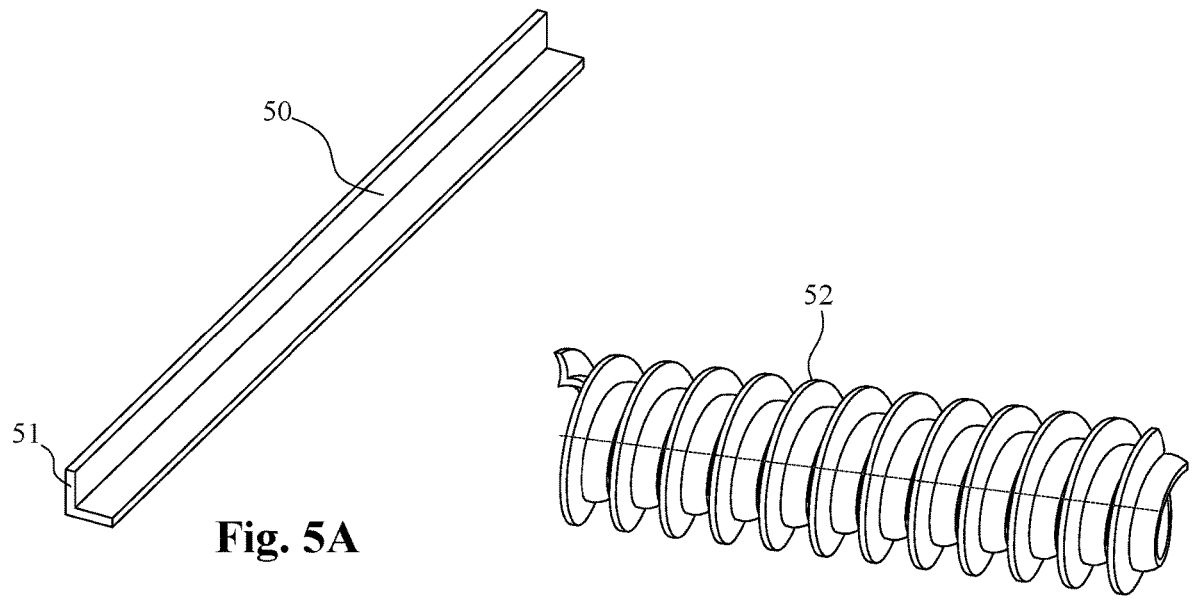
Fig. 5A
Fig. 5B
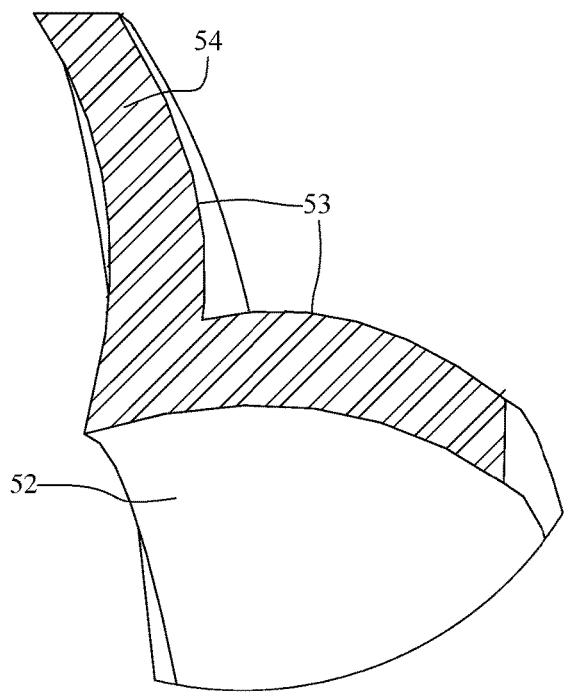
Fig. 5C

COILED SPRING

CROSS-REFERENCE TO RELATED APPLICATIONS

The present application is a new United States Non-Provisional Patent Application claiming priority to U.S. Provisional Patent Application 63/094,340 entitled "COILED TUBING" with confirmation number 1053, filed on Oct. 20, 2020. U.S. Provisional Patent Application Ser. No. 63/094,340 is hereby incorporated by reference.

FIELD

The present disclosure relates generally to a spring apparatus and methods for using a spring apparatus. More particularly, the embodiments relate to a coiled spring apparatus or device and methods for using, coiled springs for flowing water and transferring heat inside a tubular.

BACKGROUND OF THE INVENTION

Coiled springs are typically manufactured by sophisticated machines and methods. One method is to take a material in straight form and then run through a series of rollers or guides as it wraps around a mandrel in a calculated manner, such that, a precision helical coiled spring with a designed pitch and coil diameter is made. The starting material can be in straight form and is generally referred to as the "wire". Also, the material can be supplied in large length rolls but is conditioned into a non-rolled form as it enters the spring manufacturing apparatus and before it is formed into a helix. The cross-sectional geometry is generally simple in shape such as round, square, rectangular, or even elliptical. FIG. 1A shows a common helical coiled spring 10 known in the art with a solid circular cross-section 14 as shown in detail in FIG. 1C made from straight round wire 12 as shown in FIG. 1B. The circular cross-section 14 spring wire is one of the most common cross-sections. FIG. 2A shows a coiled spring known in the art with a solid square cross-section 24 shown in detail in FIG. 2C made from straight square wire 22 as shown in FIG. 2B. FIG. 3A shows a coiled spring known in the art with a solid elliptical cross-section 34 shown in detail in FIG. 3C made from straight elliptical wire 32 as shown in FIG. 3B.

As straight material is wrapped around the mandrel the material undergoes stresses. The portion of the wire from the center of the cross-sectional wire 13,23,33 as shown, as a broken line, in FIGS. 1B, 2B, 3B respectfully, towards the outside of the coil undergoes tension while the portion of the material from the cross-sectional center 13,23,33 towards the inside of the coil undergoes compression. If the diameter of the coil is large compared to the size of the wire, the stresses incurred are not as great as if the coil diameter were smaller for the same size wire.

Accordingly, there is a need for a spring having a more complex, non-symmetric wire cross-sectional geometry that would be difficult or impossible to manufacturer using current coiling methods. Embodiments of these inventions as discussed below can solve these needs.

BRIEF SUMMARY OF THE INVENTION

In one embodiment, an apparatus is disclosed. The apparatus comprises a first coiled spring having an outer circumference in a predominantly horizontal orientation; a second coiled spring having an outer circumference in a predominantly vertical orientation; the first coiled spring and the second coiled spring are attached to form a spring assembly having a section of the spring assembly that is predominantly horizontal in orientation and a section of the spring assembly that is predominantly vertical in orientation.

In one embodiment a method is disclosed for flowing water. Those four steps are: first, obtaining a tubular with an internal diameter, Second obtain a spring with an external diameter at least equal to the internal diameter of the tubular when the spring is at least partially compressed. Third, insert the spring into the internal diameter of the tubular. Fourth, compress the spring, wherein at least a portion of the external diameter of the spring contacts the internal diameter of the tubular. Fifth, flow fluid through tubular, wherein at least a portion of the fluid flows on an exterior surface of the spring.

In one embodiment a method is disclosed for transferring heat to a fluid flowing inside a tubular. This method comprises four steps. First, obtain a section of pipe suitable for fluid flow and heat transfer. Second, insert a spring inside the section of the pipe. Fourth, flow fluid through the section of pipe using the spring. Fifth, transfer heat from an energy source to the fluid flowing on the spring.

The summary above is not intended to summarize each potential embodiment or every aspect of the present disclosure.

BRIEF DESCRIPTION OF THE DRAWINGS

The foregoing is intended to give a general idea of the invention and is not intended to fully define nor limit the invention. The invention will be more fully understood and better appreciated by reference to the following description and drawings.

FIG. 3A is a coiled spring having a solid elliptical wire cross-section;

FIG. 3B is a straight spring wire having an elliptical cross-section used to make the coiled spring in FIG. 3A;

FIG. 3C is an end view of the spring wire in FIG. 3B having a circular cross-section;

FIG. 5A is a straight spring wire having an "L" shaped cross-section;

FIG. 5B is the coiled spring using the wire of FIG. 5A;

FIG. 5C is a detailed view that shows the distortion that occurs when an L shaped spring wire of FIG. 5A is coiled;

DETAILED DESCRIPTION OF THE INVENTION

Figure 1A:
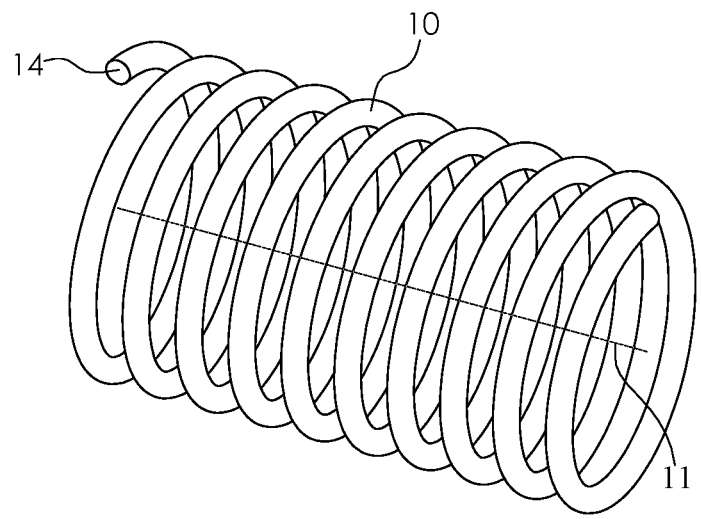
FIG. 1A is a coiled spring having a solid circular wire cross-section.
Figure 1B:
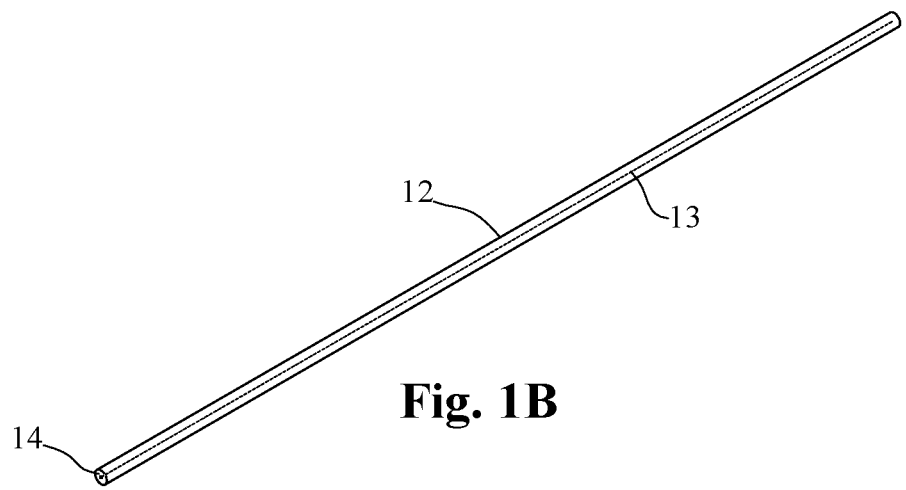
FIG. 1B is a straight spring wire having a circular cross-section used to make the coiled spring in FIG. 1A.
Figure 1C:
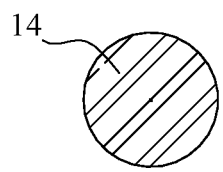
FIG. 1C is an end view of the spring wire in FIG. 1B having a circular cross-section.
Figure 2A:
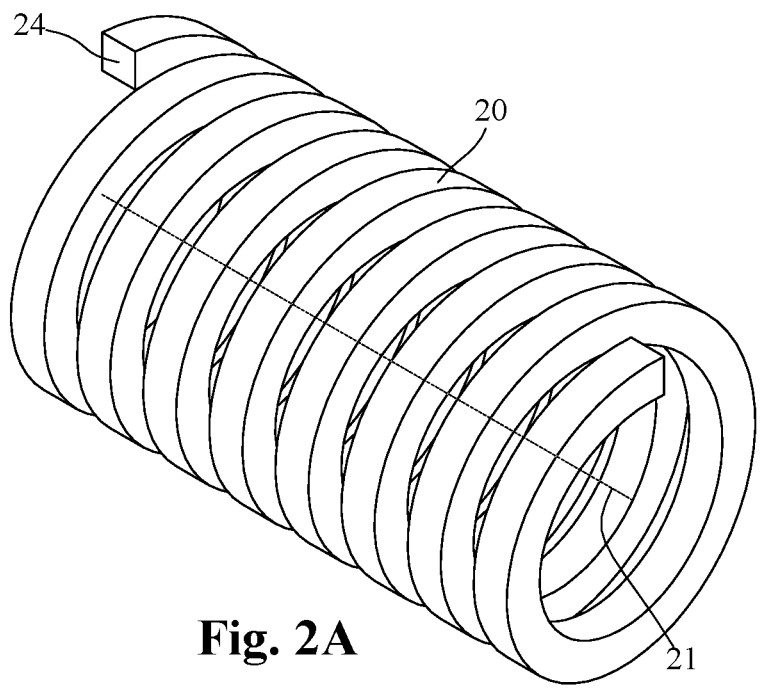
FIG. 2A is a coiled spring having a solid square wire cross-section.
Figure 2B:
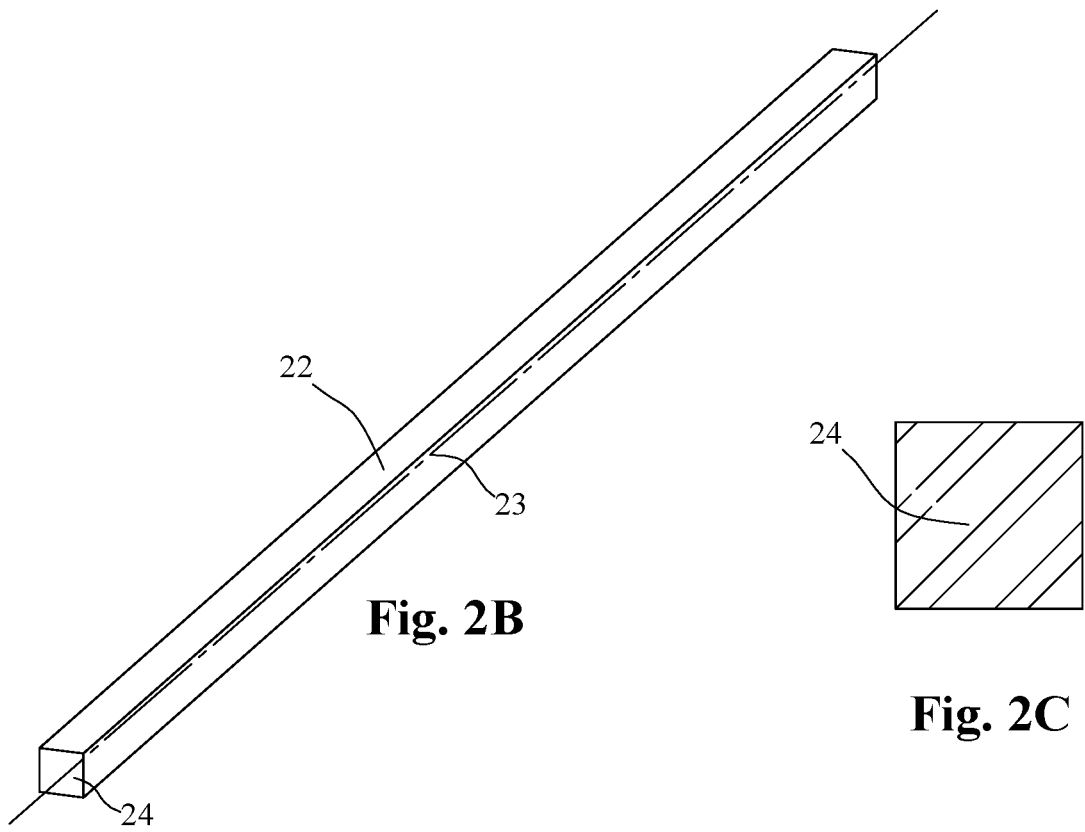
FIG. 2B is a straight spring wire having a square cross-section used to make the coiled spring in FIG. 2A.
Figure 2C:
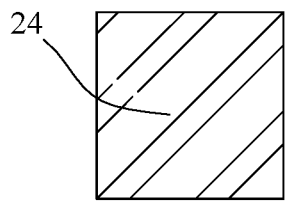
FIG. 2C is an end view of the spring wire in FIG. 2B having a square cross-section.

Before describing selected embodiments of the present disclosure in detail, it is to be understood that the present invention is not limited to the embodiments described herein. The disclosure and description herein are illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

The drawings are intended to illustrate and disclose presently preferred embodiments to one of skill in the art. These drawings are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", "first", "second" and so forth are made only concerning explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

In one embodiment, the apparatus relates to a spring assembly using individual helical coiled springs having different cross-sectional geometries attached to form a resultant complex wire cross-section. More specifically, the coils of individual springs making up the spring assembly are attached by permanent fixation. This invention also relates to a spring assembly wherein the coils of the individual springs are fixedly attached such that when the assembly is compressed or extended, the overall axial lengths, diameters, and pitches of the individual springs making up the assembly change together, co-radial without separation.

In one embodiment, the apparatus also relates to a spring assembly wherein the wire of an individual spring making up the assembly is formed, profiled, or machined to have the desired function before it is coiled into a helix having a final complex assembled shape.

In one embodiment, a method relates to novel steps of making a spring assembly by taking individually coiled springs of specific geometry and cross-section and mating the individual springs together coaxially, fixedly attached to make a complex resultant cross-sectional shape not capable using ordinary coil spring manufacturing techniques. Finally, a method of manufacturing is disclosed. This method comprises a spring wire having profiles and/or variable cross-sectional geometry along the axis of the wire used to produce a spring assembly to serve a unique function unobtainable using normal spring manufacturing methods.

When building a spring, typically, the material is in an annealed condition and can be formed into a coil at an ambient temperature called "cold coiling" while maintaining the stresses introduced into the wire within acceptable values. The coiled spring can then be heat-treated to a desired strength and elasticity.

If the stresses incurred during coiling of the raw spring material would be outside of acceptable values due to the specific material or materials used or the coil design, the spring wire is generally heated to a calculated temperature and then formed into a helical coil to reduce stresses.

Figure 4A:
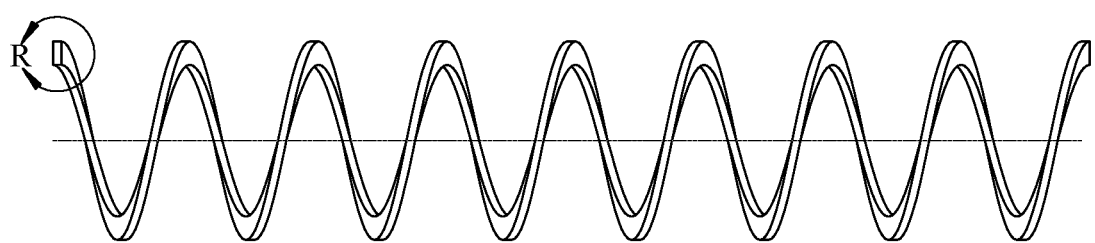
FIG. 4A is a coiled spring having a rectangular cross-section.
Figure 4B:
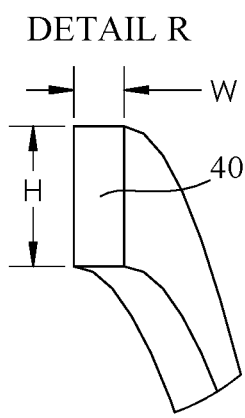
FIG. 4B is a detailed view of the cross-section of FIG. 4A.

When the cross-sectional shape of the wire departs from simple geometries such as round, square, or elliptical, the stresses are not as predictable, and distortions occur outside of acceptable values. For example, when rectangular cross-sectional wire 40 is used as shown in FIG. 4A and FIG. 4B, common practice is to use no more than a 3 to 1 height to width ratio for the wire. FIG. 4B shows the height of the wire H and the width of the wire W concerning the coil. Severe distortion of the rectangular shape generally occurs after the rectangular straight wire is coiled if the height H to width W is too high. This makes it difficult to control the final cross-sectional shape and geometry when starting with a straight wire that departs from this ratio or the starting geometry could lead to high-stress concentrations.

If cross-sectional geometries of the wires are not as symmetric as simple as solid circular or solid square cross-sections, stresses incurred during coiling are not as predictable and often lead to very unexpected distortion of the final helix. As shown in FIG. 5A for example, if a right angle "L" shaped wire 50 is used, the resulting distortion of the final coiled helix 52 and final cross-sectional geometry 54 as shown in FIG. 5B and FIG. 5C would be severe. Sides 53 would no longer be at right angles.

Individually coiled springs can be used together to form a spring assembly by associating the coils of one spring inside the coils of another. This is typically known as nesting. The physical geometry of the two coils is often acting together to keep the springs together. However, the nested springs are still individual springs and act independently when compressed or extended.

In one embodiment, a spring assembly is an assembly made of two or more individual separate springs, and in this application as a helically coiled spring. A spring wire refers to the material generally used in manufacturing a coiled spring having a long length and an axis running parallel to that length and possesses a cross-section generally as round, rectangular, square, elliptical, specialized shapes, or combinations thereof. The shapes and the combinations of shapes can be engineered for specific purposes. Coil diameter refers to the diameter of the helix formed by a coiled spring. More definitive, the outside diameter is the outer coil diameter or maximum diameter of the helical coil.

A small spring can an outside coiled diameter less than 10 centimeters, preferably less than 8 cm and even more preferably less than 5 cm in coiled diameter. A midsize spring will have an outside coiled diameter of more than 10 cm and less than 40 cm, more preferably more than 15 cm and less than 35 cm and most preferably between 20 cm and 30 cm. A large spring will have an outside diameter of more than 40 cm, more preferably greater than 50 cm and most preferably greater than 75 cm.

The inside diameter is the inner coil diameter or minimum diameter of the helical coil. A small spring will generally have an inner coiled diameter less than 5 centimeters, preferably less than 4 cm and even more preferably less than 2 cm in coiled diameter. A midsize spring will have an inner coiled diameter of more than 5 cm and less than 20 cm, more preferably more than 8 cm and less than 16 cm and most preferably between 10 cm and 15 cm. A large spring will have an inner diameter of more than 42 cm, more preferably greater than 25 cm and most preferably greater than 40 cm.

Figure 8A:
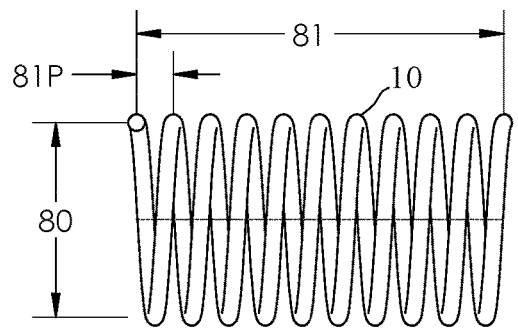
FIG. 8A shows a helical spring in a free state.
Figure 8B:
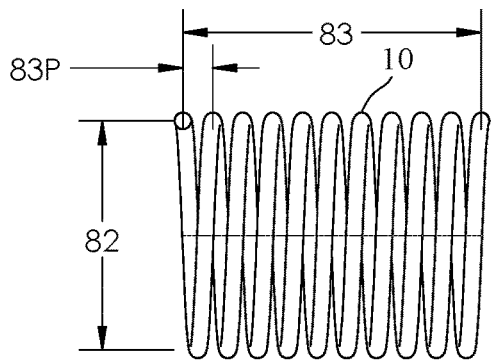
FIG. 8B shows the spring in FIG. 8A in compression.
Figure 8C:
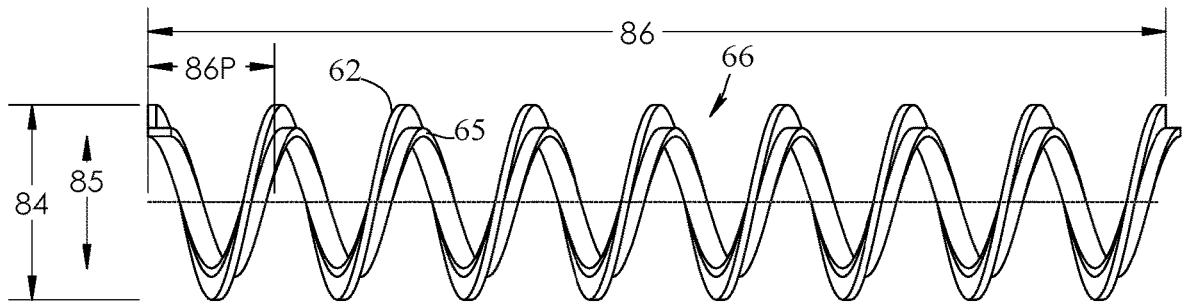
FIG. 8C shows a coiled spring assembly in a free state having a free axial length and free outside coil diameter.

An example of the outer diameter and the inner diameter is shown in FIG. 8C as 84 and 85, respectfully. The pitch of a coiled spring is the axial distance measured from one representative point on a coil to the same representative point on an adjacent coil. An example of the pitch is shown in FIG. 8A as 81P. Vertical in reference to a feature is vertical is from the top of the page to the bottom of the page. Horizontal in reference to a feature is from the left side of the page to the right side of the page. Horizontal and vertical only refer to the figures on the drawings and does not refer to the direction if manufactured or used. The pitch cannot be any less than solid height. Solid height is defined as when the spring is compressed with the one coil touching the adjacent coil. In a preferred embodiment, the pitch should be at least 3 cm and nor greater than 7 cm. In the most preferred embodiment, the pitch should be at least 4 cm and not greater than 6 cm. The pitch will depend on how much residence time and velocity the fluid flow contacting the spring needs.

Figure 6A:
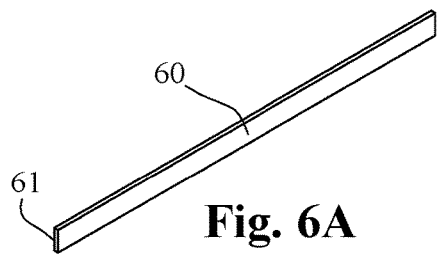
FIG. 6A is a straight spring wire having a rectangular cross-section with the longer side vertical.

An embodiment of the invention is described now in more detail. In one embodiment, FIG. 6A shows a straight spring wire 60 of the rectangular cross-section having the longer side 61 of the rectangle placed in the vertical position. The wire 60 could be supplied from a strip sheared from a plate or could be supplied from a long roll of material hundreds of feet long conditioned to be generally straight before coiling in the machine. Wire 60 when used to manufacture a coiled spring would be fed into a spring manufacturing machine, not shown, usually having an arrangement of guides and rollers.

Figure 6B:
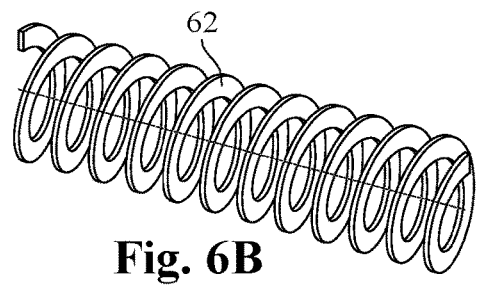
FIG. 6B is a helical spring using the wire of FIG. 6A.
Figure 6C:
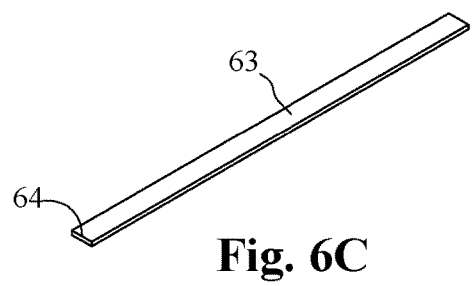
FIG. 6C is a straight spring wire having a rectangular cross-section with the longer side horizontal.
Figure 6D:
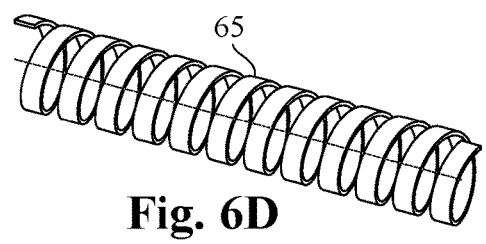
FIG. 6D is a helical spring using the wire of FIG. 6C.

The end is fastened to a mandrel of a calculated diameter such that when the mandrel is rotated and the wire 60 is fed into the machine, the wire wraps around the mandrel to form a helical spring 62 as shown in FIG. 6B having a pitch and coil diameter in an uncompressed or nonextended state, known as the free state. FIG. 6C shows a straight spring wire 63 of the rectangular cross-section having the longer side 64 of the rectangular geometry placed in the horizontal position. Wire 63 can also be supplied generally straight either from a strip of material or supplied from a large roll. Likewise, as wire 63 is fed into an arrangement of rollers and guides and onto a mandrel of calculated diameter, the wire 63 is formed into a helical spring 65 as shown in FIG. 6D having a pitch that is the same pitch in the free state as helical spring 62 in the free state shown in FIG. 6B.

In one embodiment, the coil diameter of helical spring 65 is such that the outside diameter is the same as the inside diameter of helical spring 62. In another embodiment, not shown, helical spring 62 and helical spring 65 could be formed such that the inside diameter of helical spring 65 is the same as the outside diameter of helical spring 62 but both springs 62 and 65 in their free state would have the same pitch.

As described above, the pitch of spring 62 in the free state is the same as the pitch of spring 65 in the free state. The pitch is the measurement between two adjacent helix coils taken from the same corresponding location on each coil. FIG. 8A shows helical spring 10 in a free state having a free state diameter 80, a free state axial length 81, and a free state pitch 81P. The coil diameter is the diameter measured at the cross-sectional wire axis. However, the pitch and coil diameter of a helical spring change if the spring is put in compression or tension. When the helical spring undergoes compression from the free state, the coil diameter increases, the axial length is decreased, and the pitch is less with each adjacent coil is closer together. FIG. 8B shows the free state spring 10 of FIG. 8A in compression, having a compressed coil diameter 82, a compressed axial length 83, and a compressed pitch 83P. The coil diameter 82 is greater than coil diameter 80, the axial length 83 is less than axial length 81 and the pitch 83P is less than pitch 81P. The pitch decreases and the coil diameter increases the more the spring 10 is compressed. Likewise, the pitch and coil diameter change when a helical spring is put in tension. The coil diameter decreases, and the pitch increases with each adjacent coil farther apart. The greater the tension the more the pitch increases and the more the coil diameter decreases.

FIG. 8C shows spring assembly 66 in the free state comprising two permanently attached springs 62,65 where the center axes of each spring's helix are colinear and thus the coils of each spring are concentric and each spring 62,66 making up the assembly 66 has the same pitch for its given state. The spring assembly 66 of FIG. 8C has a free state outside coil diameter 84, a free state inside coil diameter 85, a free state axial length 86, and a free state pitch 86P. In comparison, FIG. 8D shows the spring assembly 66 of FIG. 8C in compression.

Figure 8D:
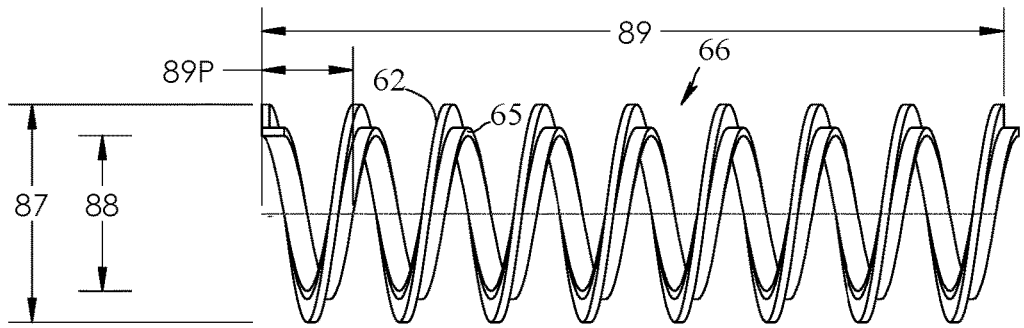
FIG. 8D shows the coiled spring assembly in FIG. 8A in a compressed state having a compressed axial length and larger outside coil diameter.

The spring assembly 66 of FIG. 8C and the spring assembly 66 of FIG. 8D is the same spring assembly. The spring assembly 66 of FIG. 8D has a compressed outside coil diameter 87, a compressed inside coil diameter 88, a compressed axial length 89, and a compressed pitch of 89P. Outside coil diameter 87 and inside coil diameter 88 of the compressed spring assembly 66 shown in FIG. 8D are larger than the corresponding outside coil diameter 84 and inside coil diameter 85 in FIG. 8D because of the spring assembly of FIG. 8D shown the same spring assembly of FIG. 8C in compression.

The coil diameters and the pitches of individual springs 62, 65 are attached in FIG. 8C and FIG. 8D making up the spring assembly 66 change harmoniously when the spring assembly 66 is put in compression or tension. More definitively, the pitch of one of the individual springs is substantially the same as the pitch of the other individual spring whether the spring assembly is in a free state, is in compression, or is in tension.

The pitch 89P of the spring assembly 66 shown in FIG. 8D is less than the pitch 86P of the same spring assembly shown in FIG. 8C because the spring assembly is in compression. Because the pitches of the two individual springs 62,65 making up the assembly 66 are the same, the axial lengths of the two individual springs 62,65 that are fixedly attached will be the same for the same state whether the spring assembly is in a free state, in a compressed state or in a tensile state. Likewise, the coil diameters of one of the individual springs increases or decreases in harmony with the continuous interface location of the other individual spring whether the spring assembly is in a free state, in compression, or in tension.

Figure 7A:
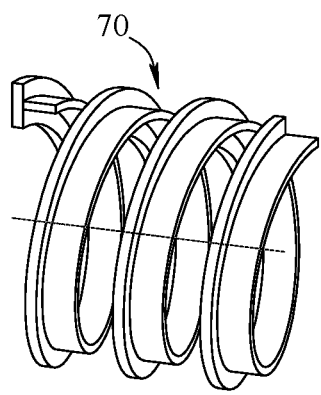
FIG. 7A is a coiled spring assembly showing two combined springs with a final cross-sectional geometry having a "T" shape.
Figure 7B:
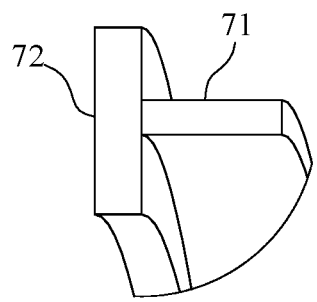
FIG. 7B is a close-up end view of the wire cross-sectional geometry of FIG. 7A.
Figure 7C:
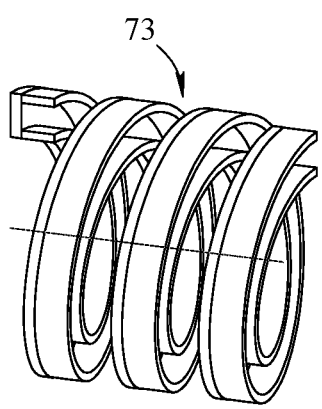
FIG. 7C is a coiled spring assembly showing two combined springs with a final cross-sectional geometry having a "C" shape.
Figure 7D:
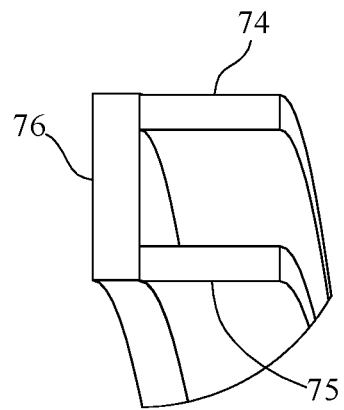
FIG. 7D is a close-up end view of the wire cross-sectional geometry of FIG. 7C.

The coils of one of the individual springs are matched in rotation and attached to the coils of another individual spring such that the coils change in diameter, axial length, and pitch as if they were one spring. The helical coils of one of the individual springs are physically attached to the helical coils of the other individual spring permanently, or in a semi-permanent manner by adhesion, cohesion, or other known methods of permanently joining and not just merely touching or nesting. In other embodiments, there could be more than two individual springs joined in this manner as shown in FIG. 7C and FIG. 7D to construct a complex resultant, unified cross-sectional geometry not possible with the same shaped solid starting wire.

Figure 6E:
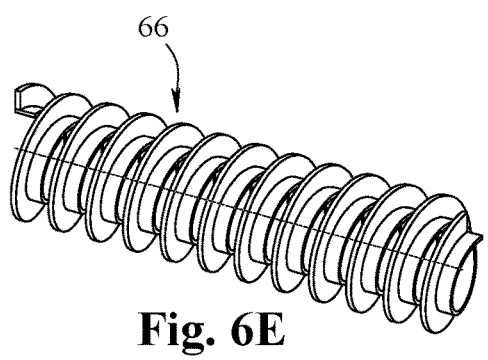
FIG. 6E is the coiled spring assembly using the springs of FIGS. 6B and 6D.
Figure 6F:
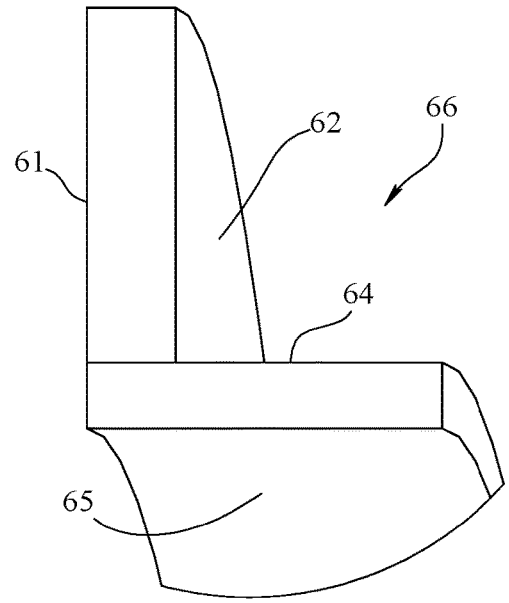
FIG. 6F is a detail view of the combined cross-sectional geometry of the spring assembly shown in FIG. 6E.

Taking the individual helical springs 62 and 65, a spring assembly 66 as shown in FIG. 6E can be made by attaching the coils of springs 62 to the coils of 65 at a designed diameter such that a resulting complex cross-sectional wire shape of the helical spring assembly 66 is made from the individual simple cross-sectional shapes of springs 62 and 65. FIG. 6F is a detailed view of the complex cross-sectional geometry of spring assembly 66 shown in FIG. 6E. with the inside diameter of a coil of helical spring 62 fixedly attached to the outside diameter of helical spring 65. However, the outside diameter or inside diameter of any of the individual springs does not have to be the interface location along the continuous helical length of the helical coil.

In one embodiment, the spring needs to have an additional surface area. The additional surface areas and be with an inner or outer pipe placed inside or outside of the springs. Alternatively, the additional surface areas can be on the spring itself if water or fluid is used on or inside the spring. For example, the increased surface areas can allow more fluid transport and facilitate more heat transfer depending on the application. The combined aspects of the springs being composed allow for creative designs to increase surface area. In the past, a single or individual spring would not be able to increase surface areas significantly. The multiple spring assembly designs of 2 or more than 2 springs, where each spring has both a more longitudinal and vertical spring component in the assembly or both an internal and external geometry such as the pipe or half-pipe spring embodiments allow more surface area.

The surface area can be measure in both the internal surface area and/or external surface area. The internal surface area is typically designed to increase the surface area of the fluid flowing on the spring which allows for increased fluid flow and/or increased heat transfer to or from the fluid flow. The exterior surface area is typically designed to increase heat transfer to and from the spring. The fluid flow can be formed by the internal geometry of the spring or by adding a horizontal and vertical pipe to the interior and/or exterior of the spring.

In one embodiment, the combined multiple spring design allows for at least a 10 percent increase of inner surface area compared to single-wire springs. More preferably, the multiple spring design allows for at a 20 percent increase of inner surface area compared to single-wire springs. Most preferably, a 30 percent increase of inner surface area compared to single-wire springs.

In one embodiment, the multiple spring design allows for at least a 10 percent increase of outer surface area compared to single-wire springs. More preferably, the multiple spring design allows for at a 20 percent increase of outer surface area compared to single-wire springs. Most preferably, a 30 percent increase of outer surface area compared to single-wire springs.

In one embodiment, the multiple spring design allows for at least a 10 percent increase of both inner and outer surface areas compared to single-wire springs. More preferably, the multiple spring design allows for at a 20 percent increase of both inner and outer surface areas compared to single-wire springs. Most preferably, a 30 percent increase of both inner and outer surface areas compared to single-wire springs.

For increasing fluid flow, the spring would have a significant vertical component in addition to the horizontal component. One embodiment would be to use pipe or half pipe. Another embodiment would be to use, one or more vertical spring components, attached to a horizontal spring component to increase fluid or water holding capacity. In one embodiment both the surface area and fluid volume capacity are increased. Preferably, the multiple spring design allows for at least a 10 percent increase of both surface area and fluid volume flow compared to single-wire springs. More preferably, the multiple spring design allows for at a 20 percent increase of both surface area and fluid volume flow compared to single-wire springs. Most preferably, a 30 percent increase of both surface area and fluid volume flow compared to single-wire springs. FIG. 7A shows a spring assembly 70 having a "T" cross-sectional geometry comprised of two individual helical springs 71 and 72 where spring 71 is attached to spring 72 between its outside and inside diameters. Again, the individual helical springs 71 and 72 when permanently attached have a resultant cross-sectional geometry that is complex compared to the simple geometries of the individual springs. If spring assembly 70 in FIG. 7A and FIG. 7B is put into compression or tension, the individual coil diameters and pitches of each spring 71, 72 would behave in like manner as the spring assembly 66 described above.

As stated above, the spring assembly can be made using more than two individual springs. FIG. 7C shows a spring assembly 73 having a "C" resultant cross-section made from three individual helical springs 74, 75, and 76. Individual springs 74, 75, and 76 as shown in FIG. 7C have the same pitch, permanently attached by adhesion or cohesion but can be by another method of permanently attaching the individual springs 74, 75, 76 at designed interface locations. If spring assembly 73 in FIG. 7C is put into compression or tension, the individual coil diameters, and pitches of each spring 74, 75, 76 would behave in like manner as the spring assembly 66 described above.

Figure 7E:
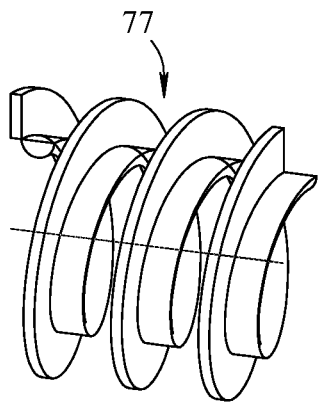
FIG. 7E is a coiled spring assembly showing two combined springs with a final cross-sectional geometry having a rectangular and semi-circle shape.
Figure 7F:
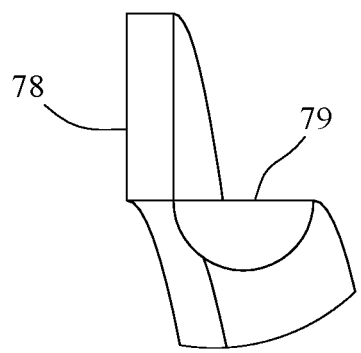
FIG. 7F is a close-up end view of the wire cross-sectional geometry of FIG. 7E.

In another embodiment shown in FIG. 7E and FIG. 7F, the individual wire cross-sections do not have to be similar in geometry. In FIG. 7F individual spring 78 has a rectangular geometry while individual spring 79 has semicircular geometry. In another embodiment (not shown), the semicircular geometry can be hollow to increase both inner surfaces are and fluid flow capacity Springs 78 and 79 again are formed with the same pitch and permanently attached so the resultant cross-sectional geometry of the cross-section is complex. Other combinations of wire geometries, combinations of 2 or more individual helical springs, and other combinations of the interfacing areas of the springs could be used and covered by this invention.

Figure 12A:
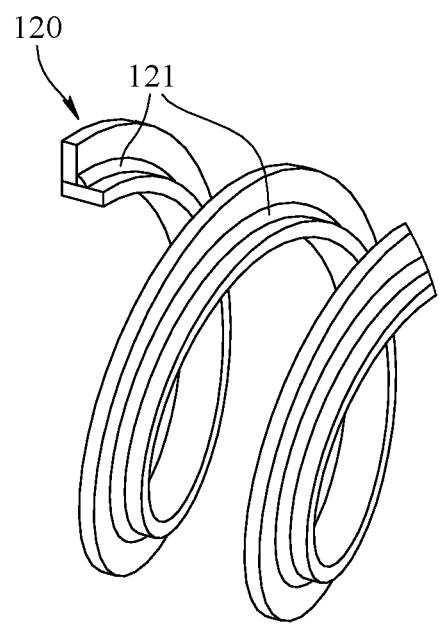
FIG. 12A shows a spring assembly where two coiled springs are fixedly attached by a continuous weld.

FIG. 12A shows a spring assembly 120, like other assemblies described above, composed of individual springs, fixedly attached along an interface area where the mating spring contact. Unlike nested springs known in the art that generally rely on the geometry of the coils to keep the individual springs together, one spring's coils fit inside the coils of another spring, the spring assemblies of this invention are permanently attached by adhesion, cohesion, other known attachment techniques such that the final assemblies act as one spring and combination thereof.

Figure 12B:
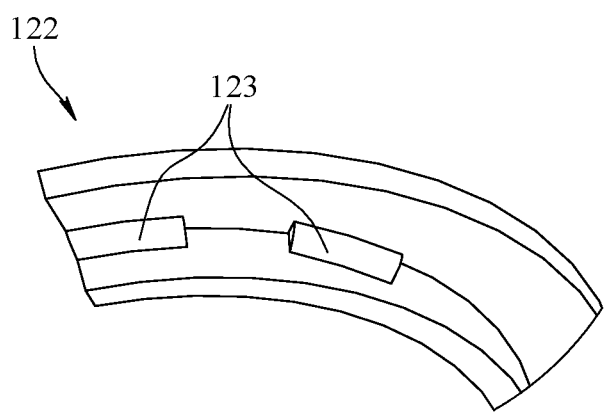
FIG. 12B shows a spring assembly where two coiled springs are fixedly attached by an intermittent weld.

Among the methods of attachment is cohesion, where the molecules are united homogeneously throughout the material. The most common technique of cohesion is welding. The welding method could be by fusion, not shown where the individual springs are melted together at the interface area to form one unified spring without the addition of fill material. Another common method of cohesively attaching the individual spring is by welding with a fill material such as a filler rod. FIG. 12A shows the two individual springs of spring assembly 120 welded together continuously proximal to the interface with a fillet weld bead 121 to permanently unite with cohesion. However, the weld bead is shown in FIG. 12A could be at another location proximal to the interface location of the two springs such as on the other side of the interface area. FIG. 12B shows a spring assembly welded together with intermittent fillet beads 123 proximal to the interface area by cohesion. The intermittent beads 123 could be any length and spacing and is not confined to the arrangement shown.

In another embodiment, the method of permanently attaching the individual helical springs is by adhesion. Adhesion refers to adhering bodies together by an adhesive where there is no molecular exchange between the bodies. In a preferred embodiment, the two springs making up the spring assembly are adhered to by brazing or soldering using heat to melt the solder into the pores of the springs without melting the spring material. One embodiment attaches the springs along the entire interface area. In another embodiment, the brazing could be done proximal to the interface area like the continuous weld bead 121 of FIG. 12A. The soldering or brazing bead proximal to the interface area could be intermittent like the intermittent bead 123 of FIG. 12B.

Figure 9A:
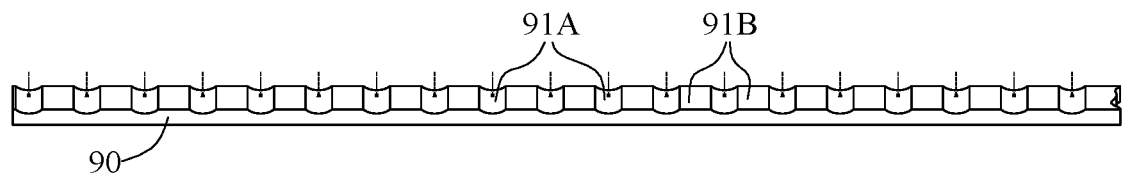
FIG. 9A shows a straight spring wire having profiles along the length.
Figure 9B:
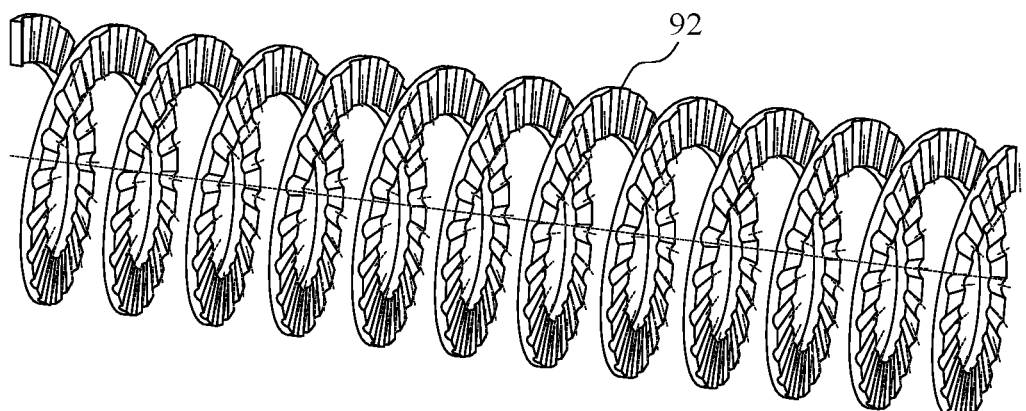
FIG. 9B shows the spring wire with profiles shown in FIG. 9A coiled into a helix.
Figure 10A:
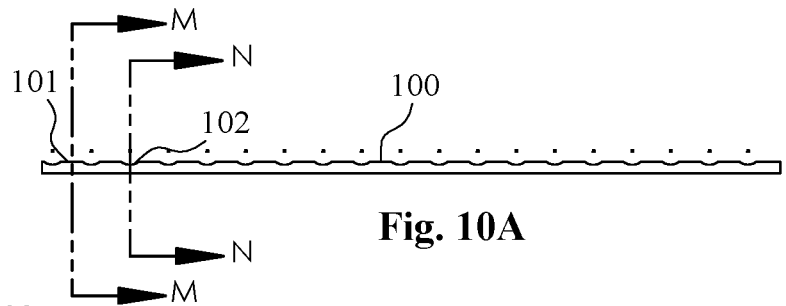
FIG. 10A is a side view of a straight spring wire having variable cross-sections with section lines at a thicker location and a thinner location along the length.
Figure 10B:
FIG. 10B is a section view of the thicker cross-sectional area of FIG. 10A.
Figure 10C:
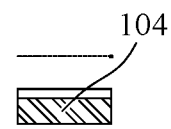
FIG. 10C is a section view of the thinner cross-sectional area of FIG. 10A.

In another embodiment, the straight spring wire used to form a helical spring can be of variable cross-section. FIG. 9A shows one embodiment of straight spring wire 90 having a cross-sectional area that is not constant. Along the axial length of the straight spring wire, 90 are areas of smaller cross-section 91A and areas of larger cross-section 91B as shown in FIG. 9A. Shown in more detail, FIG. 10A shows a straight spring wire 100 from the side and the long length of the wire 100 left to right. Also shown in FIG. 10A are section line M-M and section line N-N shown in detail in FIG. 10B and FIG. 10C, respectfully. Section line M-M is shown in FIG. 10A as an example location along the long length of the straight spring wire 100 where section cross-section 101 and as 103 shown in detail in FIG. 10B is the largest. Section line N-N is shown in FIG. 10A is an example location along the long length of the straight spring wire 100 where the cross-section 102 and as 104 shown in detail in FIG. 10C is the smallest. FIG. 9B shows the straight spring wire 90 of FIG. 9A formed into a helical spring 92.

The method of forming the helical spring 92 can be the same method described above by using a spring manufacturing machine but could be made by any other technique known in the art to form a helical spring. Before forming into a helical spring, straight spring wire 90 is shown in FIG. 9A and 100 in FIG. 10A the smaller cross-section 91A areas as shown in FIG. 9A and 102 in FIG. 10A can be manufactured into the straight spring wire 90 and 100.

This method allows the smaller areas 91A and to be easily produced. It would be exceedingly difficult or impossible to form the variable cross-sections or three-dimensional cross-sections of a spring once it has been formed into a helix. Making a straight spring wire with a variable cross-sectional area before it is formed into a helical spring can be done by various known methods in the art. The smaller cross-sectional areas 91A and 102 can be milled out of a rectangular straight wire or material removed using EDM, stamped with a die, or any known machining method in the art. The areas of the smaller cross-sectional area can be formed in any starting geometric cross-section straight wire such as square, round, or elliptical. The areas 91A and 102 do not have to be cut as semi-circles as seen from the side as shown in FIG. 9A and FIG. 10A but could be square, V-shaped, or any other cut shape. The pattern of variable cross-sections manufactured in the straight spring wire could have any pattern of spacing, variable spacing, combinations of different shapes, all not shown, but are covered by this invention.

Figure 9C:
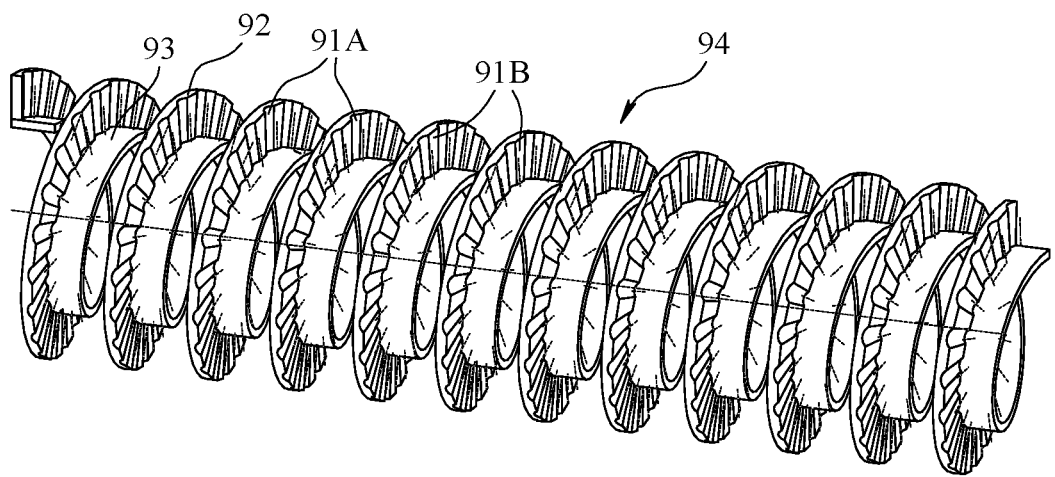
FIG. 9C shows a spring assembly using the coiled spring in FIG. 9B and a rectangular wire combined.

The helical spring 92 as shown in FIG. 9B can then be used with another independent helical spring 93 as shown in FIG. 9C to make a spring assembly 94 as shown in FIG. 9C.

Independent helical springs 92 and 93 have the same pitch when formed and are fixedly attached by the method described in detail above. In another embodiment, not shown, the helical spring 93 could be formed with a variable cross-sectional geometry as described above. Then a spring assembly could be made having both or all the individual springs formed from straight spring wire with variable cross-sectional geometry.

Figure 10D:
FIG. 10D is a side view of a straight spring wire having a wavy profile.
Figure 10E:
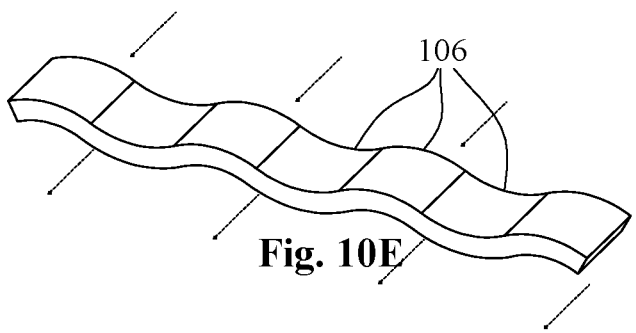
FIG. 10E is an isometric view of the straight spring wire shown in FIG. 10D.
Figure 10F:
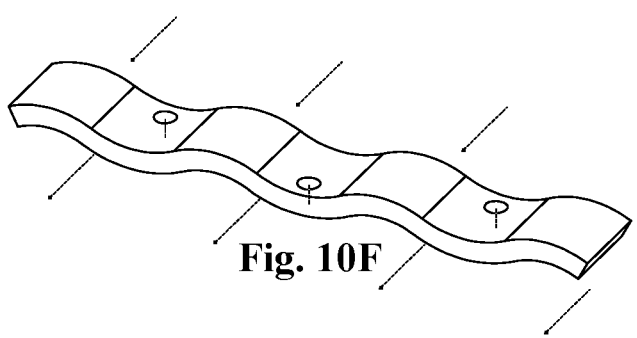
FIG. 10F is an isometric view of the straight spring wire shown in FIG. 10D having perforations along the length.

FIG. 10D shows another embodiment of straight spring wire 105 having waves 106 formed along its long axis. FIG. 10D shows the straight spring wire from the side viewing the long length. FIG. 10E is an isometric view showing the spring wire 105 in a different perspective for more detail. This wavy straight spring wire could then be used to form by methods described above a spring assembly, not shown, where one or all the individual helical springs have the wavy form. This design would increase the internal surface area.

Figure 11A:
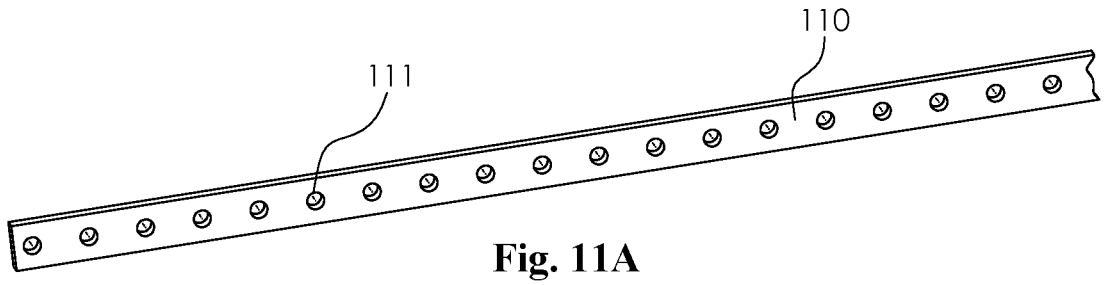
FIG. 11A shows a straight spring wire having perforations along the length.

In another embodiment, FIG. 11A shows a straight spring wire 110 having perforations 111 along the long length. The embodiment is shown in FIG. 11A has rounds holes as perforations but other embodiments, not shown, could have square perforations or any shape perforations installed. This would further increase the internal surface areas a portion of the fluid would flow through the perforations. The perforations can be drilled or punched or cut through the metal or other material forming the spring or spring assembly.

Figure 11B:
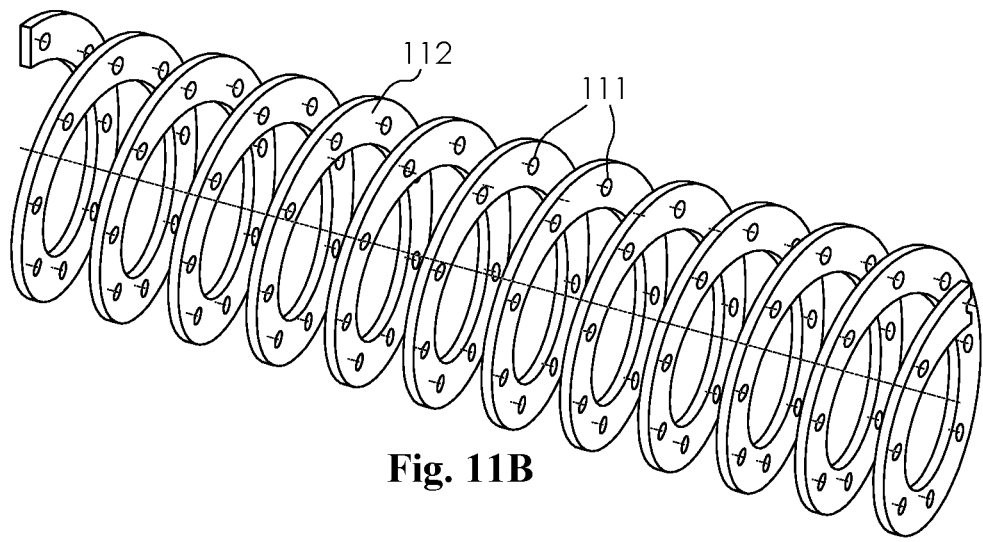
FIG. 11B shows the spring wire with perforations shown in FIG. 11A coiled into a helix.
Figure 11C:
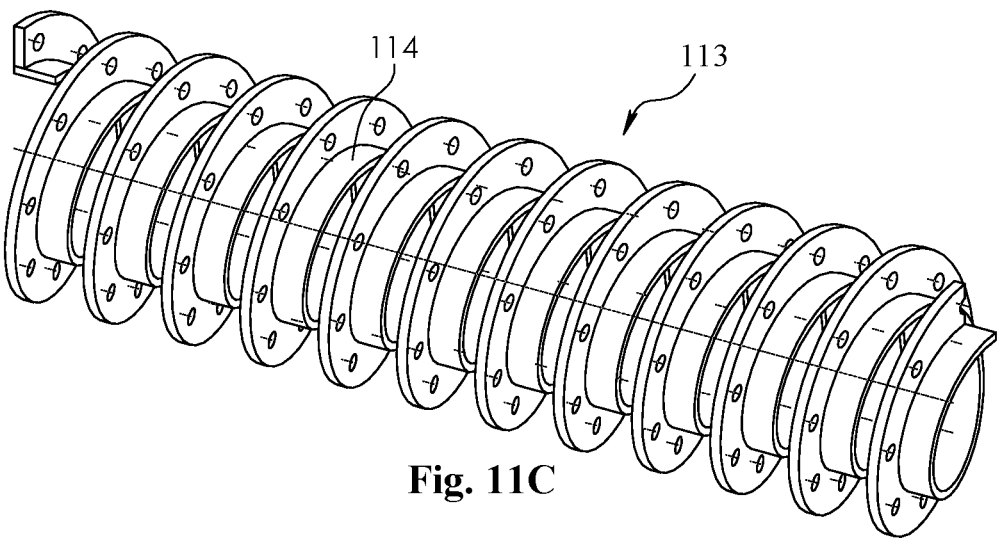
FIG. 11C shows a spring assembly using the coiled spring shown in FIG. 11B and a rectangular wire combined.

In other embodiments, not shown, the perforations could be in an array along the length such that two or more perforations could be side by side, and that pattern spaced along the length of the straight wire 110. Any pattern of perforations could be formed in the straight spring wire and covered by this invention. FIG. 11B shows the perforated straight spring wire of FIG. 11A formed into a helical spring 112 and showing the perforations 111. Then spring assembly 113 as shown in FIG. 11C can be made from individual helical springs 112 as shown in FIG. 11B and 114 as shown in FIG. 11C, where the individual springs 112 and 114 can be permanently attached by methods described in detail above. In other embodiments, not shown, the individual spring 114 as shown in spring assembly FIG. 11C could be made using the perforated spring wire 110 shown in FIG. 11A. Yet in other embodiments, not shown, the spring assembly 113 of FIG. 11C could be made from individual spring wires both having perforations 111. The perforations in the spring can be used to create additional flow paths or multiple flow paths. The additional flow paths or multiple flow paths could be useful in separating heavier contaminates from lighter density vapors in multi-phase flow. These multi-phase flow often occur during industrial heating operations including distillation and desalination operations.

Figure 5D:
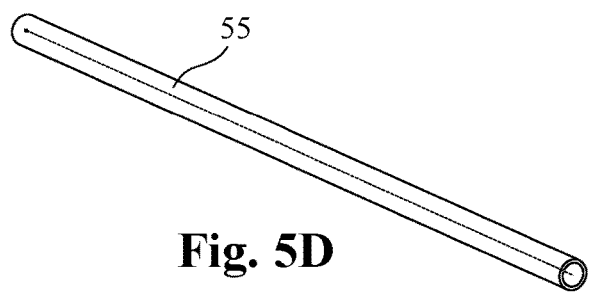
FIG. 5D is a straight spring wire having a hollow pipe cross-section.

In another embodiment, the spring wire could be round tubular in the shape shown in FIG. 5D as 55. As shown in FIG. 5H, the tubular wire could then be formed into a helical spring 57. Fluid could be allowed to flow inside the tubular at a calculated rate to achieve favorable flow rates, volume, and residence time. The internal surface area of the helical could be increased or decreased by varying the tubular inside diameter or varying the coil diameter and pitch.

Figure 5E:
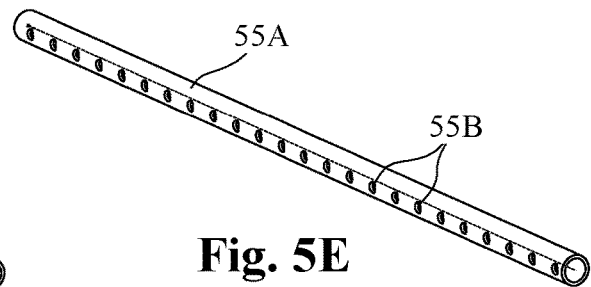
FIG. 5E is a straight spring wire having a hollow pipe cross-section with perforations or holes drilled into the wire.

In another embodiment, perforations 55B could be formed along the length of a straight tubular wire 55A as shown in FIG. 5E. The perforations 55B could be easily added while the material is straight by known methods and then formed into a helical coil 57A having perforations 57B along the side of the helical length. Known methods of creating perforations include drilling, hole punching, three-dimensional printing, casting, forming via molds, and combinations thereof. During the coiling process, the straight tubular wire 55A with perforations 55B could be oriented such that when the wire is coiled into a helical coil 57A, the perforations 57B could be at any radial location, not shown. Any configuration of size, shape, spacing, or pattern could be used to make the perforations. If the helical spring 57A shown in FIG. 5I is placed such that the coil axis vertical and the perforations facing downward, a liquid flowing inside the tubular, a portion could also flow out through the holes to the outside of the tubular coil adding even for the surface area available to the helical spring. The size and number of the perforations can be chosen to improve the amount of fluid flow, increase the number of flow paths, and increase the surface area of the fluid flow by creating droplets flowing from the spring.

Figure 5F:
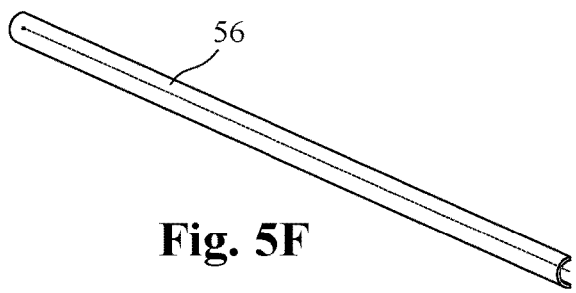
FIG. 5F is a straight spring wire having a half-pipe cross-section.

Yet in another embodiment shown in FIG. 5F, the straight spring wire 56 could be a half-pipe in a geometric shape. During coiling the spring wire 56 could be oriented such that the resultant cross-section makes a helical halfpipe spring 58 is as shown in FIG. 5J. Again, if the coiled spring 58 shown in FIG. 5J was positioned such that the coil axis was vertical a liquid could flow in the inside of the halfpipe. The surface area in contact with the fluid could be increased or decreased by varying the radii of the cross-sectional half pipe size and varying the diameter of the coil and pitch.

Figure 5G:
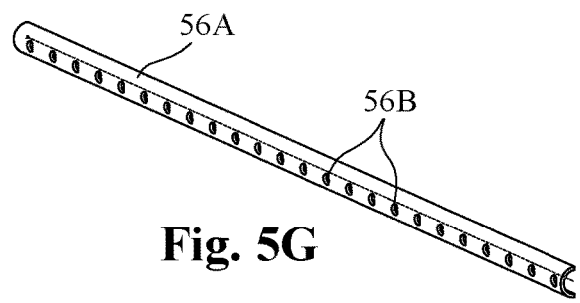
FIG. 5G is a straight spring wire having a half-pipe cross-section with perforations or holes drilled into the wire.
Figure 5H:
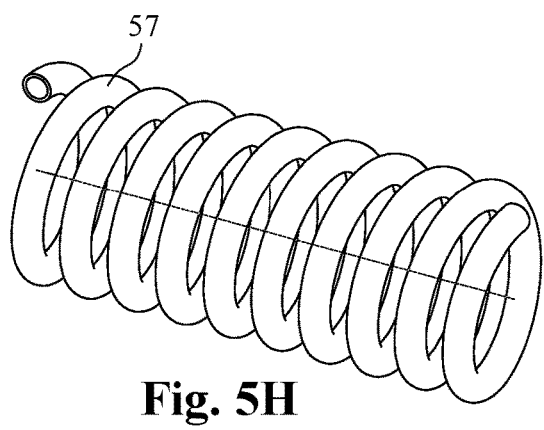
FIG. 5H is the coiled spring using the wire of FIG. 5D.
Figure 5I:
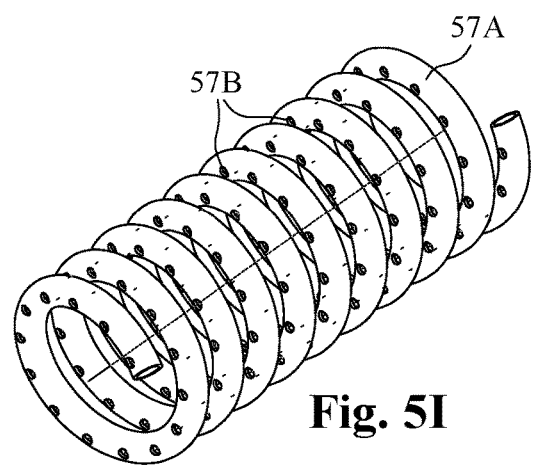
FIG. 5I is the coiled spring using the wire of FIG. 5E.
Figure 5J:
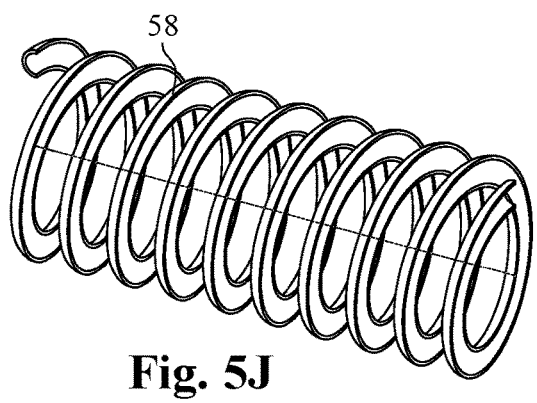
FIG. 5J is the coiled spring using the wire of FIG. 5F.
Figure 5K:
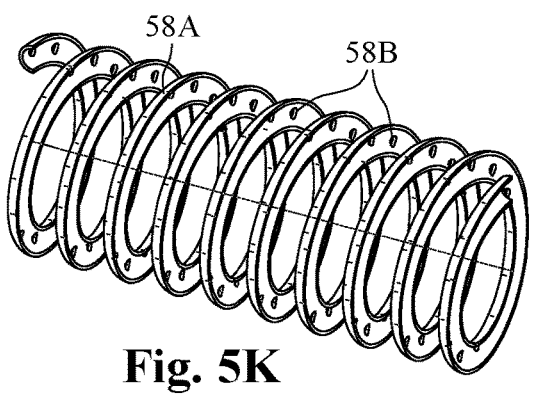
FIG. 5K is the coiled spring using the wire of FIG. 5G.

Yet in another embodiment shown in FIG. 5G, the half-pipe straight wire could have perforations 56B along the axial length. Any configuration of size, shape, spacing, or pattern could be used. The pattern of perforations 56B shown in FIG. 5G is but one example of perforations. Any configuration of size, shape, spacing, or pattern could be used to make the perforations. As shown in FIG. 5K, the perforated straight wire 56A of FIG. 5G could be oriented when forming the coiled helical spring such that the perforations 58B would be spaced along the helical length of the coil. In this embodiment, if a liquid were to flow into the interior of the cross-section while the helical spring 58A was in a vertical placement described above, a portion of the liquid could pass through the perforations 58B.

Method:

The spring embodiments described are very effective in flowing fluids such as water inside tubular objects such as pipes and/or transfer heat to fluids inside a tubular. The amount of contact on a tubular, fluid flow, heat transfer, and water residence time can be optimized, as described above.

One method allows for transferring heat to a fluid flowing inside a tubular. This method comprises four steps. First, obtain a section of pipe suitable for fluid flow and heat transfer. Second, insert a spring inside the section of the pipe. Fourth, flow fluid through the section of pipe using the spring. Fifth, transfer heat from an energy source to the fluid flowing on the spring.

One method allows for flowing water inside a tubular. This method comprises four steps. First, obtain a tubular with an internal diameter. Second, obtain a spring with an external diameter at least equal to the internal diameter of the tubular when the spring is at least partially compressed. Third, insert the spring into the internal diameter of the tubular. Fourth, compress the spring, wherein at least a portion of the external diameter of the spring contacts the internal diameter of the tubular. Fifth, flow fluid through tubular, wherein at least a portion of the fluid flows on an exterior surface of the spring.

An additional embodiment involves allowing the lighter vapor to exit the top of the tubular and the heavier contaminates to exit the bottom of the tubular. Alternative flow paths inside the tubular would enable the lighter vapor to take a different flow path than the heavier contaminates. These alternative flow paths can be created by having multiple holes in the tubular with an exit on the top and an exit and the bottom of the tubular. Additional flow paths can be formed by additional baffles and holes inside the tubular or connected to the spring.

There are other embodiments of spring assembly configurations and methods of using springs that utilize these individual embodiments and can also utilize combinations of the embodiments disclosed. All such embodiments are intended to be within the scope of the invention.

What is claimed is:

1. An apparatus comprising:
a first coiled spring made from annealed material having an outer circumference and a first cross-section, the first cross-section having a greatest length in a predominantly horizontal direction;
a second coiled spring made from annealed material having an outer circumference and a second cross-section, the second cross-section having a greatest length in a predominantly vertical direction;
the first coiled spring and the second coiled spring are cohesively attached to form a spring assembly having a section of the spring assembly having an outer circumference and a third cross-section, the third cross-section greatest length in the predominantly horizontal direction is from the first spring and the greatest length in the predominantly vertical direction is from the second spring, further comprising a pipe wherein the spring assembly is inside the pipe, and wherein the spring assembly third cross-section is capable of fluid flow inside the pipe, wherein the cross-sectional area of the spring assembly is variable along its length.

2. The apparatus of claim 1, further comprising a plurality of perforations in the predominantly vertical direction of the third cross-section of the spring assembly.

3. The apparatus of claim 1, wherein the spring assembly is the A capable of fluid flow with the spring assembly inside the pipe to form an additional wall on the exterior of the spring assembly.

4. The apparatus of claim 1, further comprising a third coil that is cohesively attached to the first coil, wherein the spring assembly comprises three springs cohesively attached and the first coiled spring has a plurality of perforations.

5. The apparatus of claim 4, wherein the second coiled spring has a width shorter than the first coiled spring.

6. The apparatus of claim 1, wherein the external diameter of the spring assembly increases when the spring assembly is compressed and the external diameter of the spring assembly decreases when the spring assembly is extended.

7. The apparatus of claim 1, wherein the spring assembly is a helical spring, and wherein a third spring coil is cohesively attached to the first spring coil and the spring assembly comprises three springs.

8. The apparatus of claim 1, wherein the first coiled spring and the second coiled spring have the same pitch in the spring assembly.

9. A method of transferring heat to a fluid, the method comprising;
a. obtaining a section of pipe suitable for fluid flow and heat transfer;
b. inserting a spring inside the section of the pipe wherein the spring comprises a first coiled spring made from annealed material having an outer circumference and a first cross-section, the first cross-section having a greatest length in a predominantly horizontal direction, a second coiled spring made from annealed material having an outer circumference and a second cross-section, the second cross-section having a greatest length in a predominantly vertical direction, the first coiled spring and the second coiled spring are cohesively attached to form a spring assembly having a section of the spring assembly having an outer circumference and a third cross-section, the third cross-section greatest length in the predominantly horizontal direction is from the first spring and the greatest length in the predominantly vertical direction is from the second spring, and wherein the spring assembly third cross-section is capable of fluid flow inside the pipe, wherein the cross-sectional area of the spring assembly is variable along its length;
c. flowing fluid through the section of the pipe using the spring; and
d. transferring heat from an energy source to the fluid flowing on the spring.

10. The method of claim 9, wherein the spring has a pitch and further comprising controlling the residence time of the fluid inside the section of the pipe by the pitch of the spring.

11. The method of claim 9, further comprising increasing surface area of the fluid flowing by creating droplets by flowing the fluid through perforations in the spring.

12. The method of claim 9, further comprising transferring heat energy from an exterior portion of the pipe to the fluid flowing on the spring.

13. A method of flowing fluid through a tubular, comprising:
a. obtaining a tubular with an internal diameter
b. obtaining a spring with an external diameter at least equal to the internal diameter of the tubular when the spring is at least partial compressed, and wherein the comprises a first coiled spring made from annealed material having an outer circumference and a first cross-section, the first cross-section having a greatest length in a predominantly horizontal direction, a second coiled spring made from annealed material having an outer circumference and a second cross-section, the second cross-section having a greatest length in a predominantly vertical direction, the first coiled spring and the second coiled spring are cohesively attached to form a spring assembly having a section of the spring assembly having an outer circumference and a third cross-section, the third cross-section greatest length in the predominantly horizontal direction is from the first spring and the greatest length in the predominantly vertical direction is from the second spring, and wherein the spring assembly third cross-section is capable of fluid flow inside the tubular, wherein the cross-sectional area of the spring assembly is variable along its length;
c. inserting the spring into the internal diameter of the tubular
d. compressing the spring, wherein at least a portion of the external diameter of the spring contacts the internal diameter of the tubular; and
e. flowing fluid through tubular, wherein at least a portion of the fluid flows on an exterior surface of the spring.

14. The method of claim 13, further comprising transferring heat energy from an exterior portion of the pipe to the fluid flowing on the spring.

15. The method of claim 13, wherein the spring has a pitch and further comprising controlling the residence time of the fluid inside the section of the pipe by the pitch of the spring.

16. The method of claim 13, further comprising increasing surface area of the fluid flowing by creating droplets by flowing the fluid through perforations in the spring.

17. The method of 11 further comprising allowing the lighter vapor to exit the top of the tubular and the heavier contaminates to exit the bottom of the tubular.

18. The apparatus of claim 1, wherein the first coiled spring and the second coiled spring are made from spring wire.

19. The apparatus of claim 1, wherein the first coiled spring and the second coiled spring are formed into a coil at an ambient temperature.

20. The apparatus of claim 1, wherein the first coiled spring and the second coiled spring are heat-treated to a desired strength and elasticity after being formed into a coil.

21. The apparatus of claim 19, wherein the first coiled spring and the second coiled spring are heat-treated to a desired strength and elasticity after being formed into a coil.

22. The apparatus of claim 1 wherein the spring assembly has the coils of the second coiled spring inside the first coiled spring.

23. The apparatus of claim 1, wherein the spring assembly is assembled by fusion welding.

* * * * *